US006553418B1

(12) United States Patent
Collins et al.

(10) Patent No.: US 6,553,418 B1
(45) Date of Patent: Apr. 22, 2003

(54) ENERGY INFORMATION AND CONTROL SYSTEM

(76) Inventors: Daniel J. Collins, 4811 W. Parkview Dr., Mequon, WI (US) 53092; Jeffrey S. Zingsheim, 930 E. Manitowoc Ave., Oak Creek, WI (US) 53154; Scott E. Coursin, N3 W22626 Lexington Dr., Waukesha, WI (US) 53186; Thomas P. Gasper, W144 N10522 Heritage, Germantown, WI (US) 53022; Ilya Basin, 2645 N. Farwell Ave., #306, Milwaukee, WI (US) 53211; James P. Conigliaro, 8731 W. Glenwood Dr., Greendale, WI (US) 53129

( * ) Notice: Subject to any disclaimer, the term of this patent is extended or adjusted under 35 U.S.C. 154(b) by 0 days.

(21) Appl. No.: 09/239,428

(22) Filed: Jan. 2, 1999

(51) Int. Cl.[7] ............................................. G06F 15/173
(52) U.S. Cl. ........................ 709/224; 709/200; 709/205; 709/217; 307/31; 307/32; 700/286; 700/287; 700/291; 700/295; 700/297; 700/299
(58) Field of Search ................................ 709/200, 205, 709/224, 217; 307/31, 32; 700/286, 287, 291, 295, 297, 299

(56) References Cited

U.S. PATENT DOCUMENTS

| | | | | |
|---|---|---|---|---|
| 4,341,345 A | * | 7/1982 | Hammer et al. | 236/46 R |
| 5,576,700 A | * | 11/1996 | Davis et al. | 340/825.16 |
| 5,805,458 A | * | 9/1998 | McNamara et al. | 702/60 |
| 6,023,507 A | * | 2/2000 | Wookey | 380/21 |
| 6,073,174 A | * | 6/2000 | Montgomerie et al. | 709/224 |
| 6,088,688 A | * | 7/2000 | Crooks et al. | 705/412 |
| 6,122,603 A | * | 9/2000 | Budike, Jr. | 702/182 |
| 6,208,266 B1 | * | 3/2001 | Lyons et al. | 340/870.02 |
| 6,240,450 B1 | * | 5/2001 | Sharples et al. | 709/224 |

* cited by examiner

Primary Examiner—Saleh Najjar
(74) Attorney, Agent, or Firm—Michael Best & Friedrich LLP

(57) ABSTRACT

An energy management system for monitoring and analyzing the power consumption at a plurality of locations. The energy management system includes a primary server connected to at least one building server or other device through a computer network. Each of the building servers are connected to one or more energy meters contained in a building. The primary server sends out a data request and receives energy usage information from each of the individual building servers. The primary server stores the energy usage information in a power database such that the information can be processed in a variety of manners, such as aggregating the energy usage information from multiple locations into a single energy consumption statistic. The primary server can be accessed by remote monitoring stations to view and analyze the energy usage information stored in the power database.

6 Claims, 3 Drawing Sheets

ENERGY INFORMATION AND CONTROL SYSTEM

BACKGROUND OF THE INVENTION

Information related to the cost of electricity is of great significance to both suppliers and consumers of electricity. The cost of electric power sold to a large consumer, such as a manufacturing facility or hotel chain, is often determined by a two part formula. The first part of the energy bill is determined by the measured amount of electricity consumed over a billing period. The second portion of the total electric bill is based on the peak demand required by the customer during the billing period. Oftentimes, the portion of the electric bill based upon the peak demand exceeds the portion of the bill based on actual usage. In some industries, the cost of electricity can account for more than 15% of the operating costs for the business owner. Therefore, if the facility management personnel can monitor the energy consumption and reduce the peak demand, the energy costs for the facility can be greatly decreased.

In recent years, a move has been made to deregulate the electric power industry, which would allow electric customers to purchase electric power from the cheapest source, regardless of where the source is located. Therefore, a large consumer having multiple locations in different parts of the country could purchase their entire electric power supply from a single producer.

If the electric power for multiple facilities is purchased from a single producer and aggregated into a single lump sum, an abnormal peak demand from one the facilities is absorbed into the combined aggregate. Thus, the demand-based portion of the electric bill is less than if each of the facilities were billed individually.

Problems exist, however, when multiple buildings are combined into a single aggregate sum. In most facilities, facility management personnel monitor the energy usage and can detect any abnormal variations in usage. However, if multiple buildings are combined, the facility management personnel is oftentimes unable to monitor all of the facilities in a timely manner from a central location. Thus, if one of the remote facilities is experiencing abnormally high power consumption, the facility management personnel may not detect the abnormality until it is too late to take preventative action.

Therefore, a need exist for an energy information and control system that allows the facility management personnel to monitor multiple remote facilities in a timely manner from a central location. Likewise, a need also exists for a utility provider to have accurate and real-time information across multiple consumers.

It is an object of the present invention to provide an energy information and control system that can receive power related information, on either a real-time or historic basis, from a plurality of locations and allow the user to access the information from a remote location. It is another object of the invention to provide an energy information and control system that utilizes currently available computer networks to link remotely located facilities to a single primary server. It is another object of the invention to provide an energy management system that combines the energy information from a plurality of locations into a single aggregate sum that can be accessed by the consumer or utility real-time or on a historic basis.

It is a further object of the invention to provide an energy information and control system that can be connected to operate and monitor a remote energy generator. It is still a further object of the invention to provide an energy information and control system that can calculate current energy consumption costs and activate the remote energy generator when the cost of operating the remote generator is less than the cost of the energy received from the utility. Still further, it is an object of the invention to provide a system that can both push and pull real-time energy information across a computer network from individual energy meters.

SUMMARY OF THE INVENTION

The present invention is an energy information and control system for monitoring and analyzing the power consumption at a plurality of separate locations. The energy information and control system of the invention is centered around a computer network that allows various devices to communicate with each other. The energy information and control system includes a primary server connected to the computer network. The primary server communicates across the computer network to a plurality of devices that monitor energy consumption within a building and are capable of communication across the computer network. Typically, a building server is used to provide a gateway to the computer network for devices that cannot communicate across the network. The building server is connected to at least one energy meter that measures the amount of energy being used by at least a portion of a building. The building server acts as a gateway to permit the individual energy meter to send information across the computer network.

Alternatively, the energy information and control system of the invention can include individual energy monitoring devices that can be connected directly to the wide area computer network. Each of these individual devices include communication components that allow the device to communicate directly across the computer network without utilizing the building server to act as a gateway.

In addition to the energy monitoring devices, a remote power generator can also be connected to the computer network. The remote power generator includes components that permit the generator to communicate across the network. When the energy information and control system is operating, the primary server calculates the current cost of the energy being consumed and compares the cost to the cost of operating the remote power generator. If the cost of operating the remote generator is less than the cost of the energy being purchased from the utility, the primary server can either generate a signal or directly activate the generator over the network. Alternatively, a utility provider could be given access to the customer-owned generators and activate numerous generators when the demand for energy reaches the maximum the utility can provide.

At least one monitoring station is coupled to the computer network to access the information stored in the primary server. The monitoring station can be located at a separate location from both the primary server and the plurality of building servers.

During operation of the energy information and control system, the primary server sends a signal across the computer network triggering an individual building server, or other device capable of transmitting information directly across the network, to transmit energy usage information across the network to the primary server. Additionally, the devices connected to the network can be configured to "push" information across the network at selected intervals. Upon receiving the energy usage information, the primary server translates the energy usage information into a form that can be stored within the power database. The primary server requests information from each building server at predetermined time intervals such that the primary server maintains a historic power database and provides access to real-time information.

The primary server includes server software that allows a monitoring station to access the power database and view the contents of the power database in a conventional manner. Thus, the monitoring stations can access the data stored in the power database across the computer network.

The primary server can aggregate the energy usage information received from a plurality of distinct locations and energy meters. By aggregating the energy usage information from multiple locations, the primary server can provide energy consumption statistics for multiple locations located relatively large distances apart.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
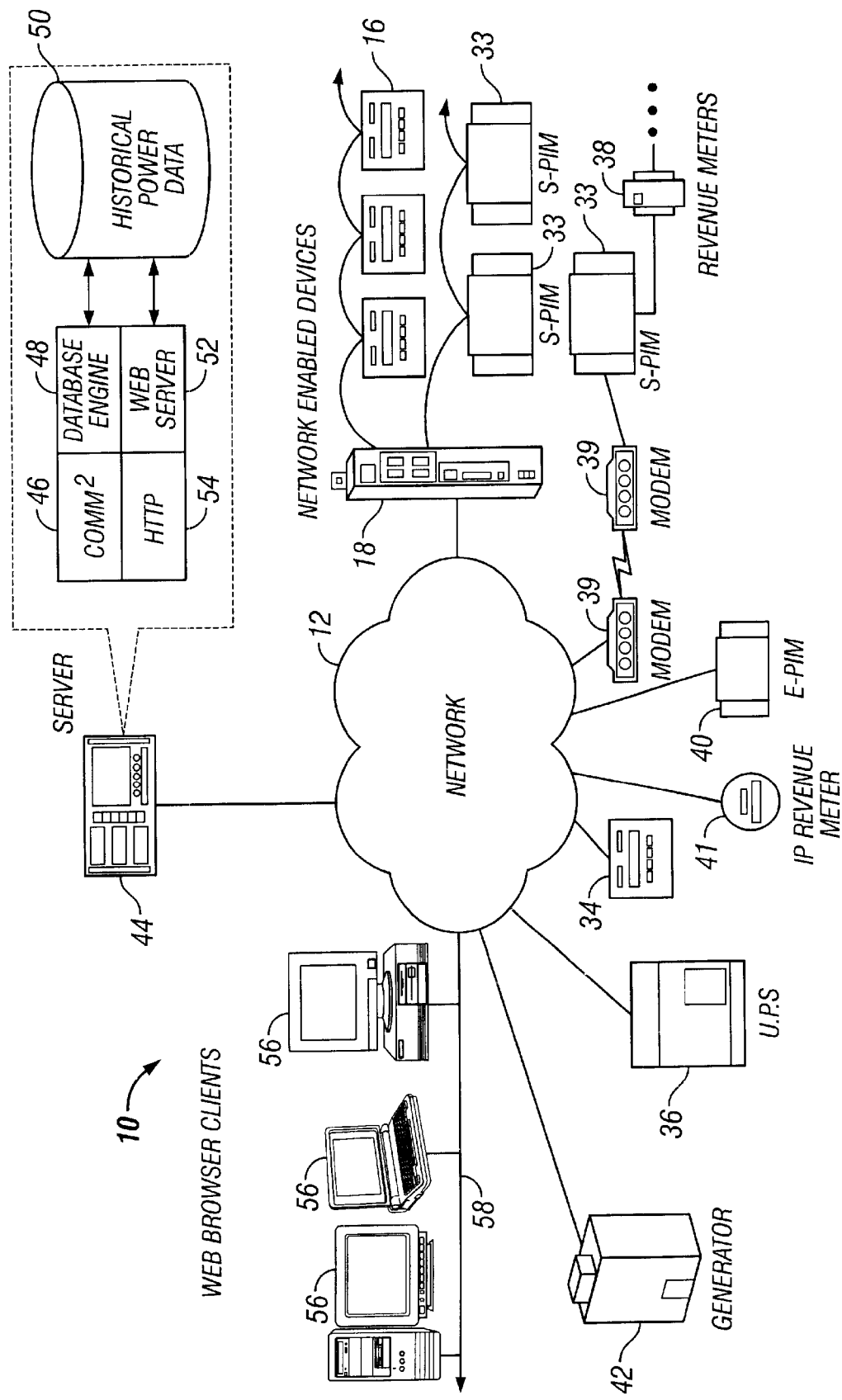
FIG. 1 is a schematic illustration of the energy management system in accordance with the present invention.

The energy information and control system 10 of the present invention is shown in FIG. 1. The energy information and control system 10 is centered around a computer network 12. In the preferred embodiment of the invention, the computer network 12 is the Internet, although other types of network configurations can be utilized as will be discussed in detail below. The computer network 12 allow a variety of devices connected to the network to communicate with each other without being directly connected.

In the preferred embodiment of the invention shown in FIG. 1, a variety of energy monitoring devices are shown connected to the computer network 12 to transfer information across the network 12. The first type of energy monitoring device that can be connected to the network 12 is a simple electric meter 16. Since simple electric meters 16 do not include the internal software or hardware to communicate over the computer network 12, the electric meters 16 are each connected to a building server 18 that acts as a generic gateway to the network 12. The building server 18 is typically positioned within a building and is connected to the numerous electric meters 16 contained within the building.

Figure 2:
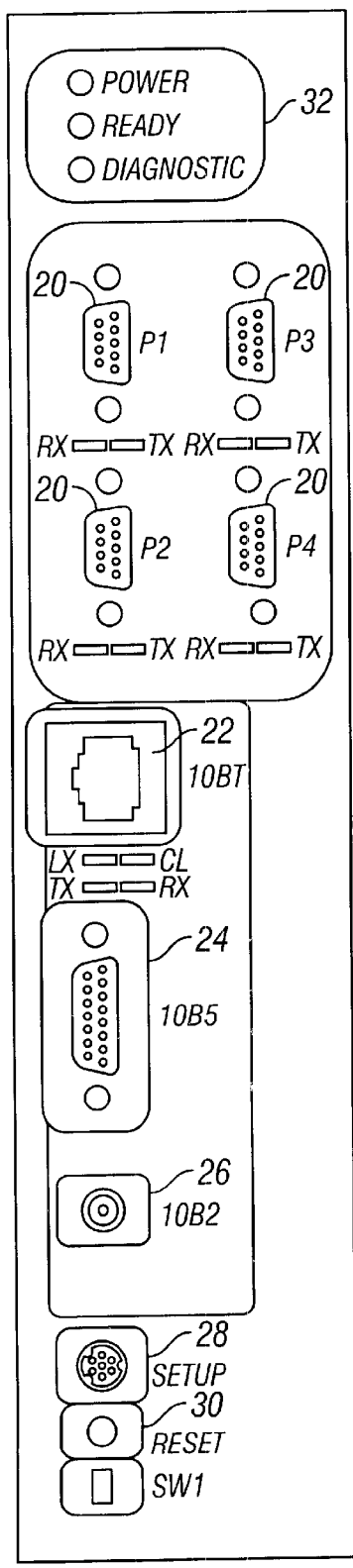
FIG. 2 is a front view of the front panel of the building server incorporated in the energy management system of the present invention.

As shown in FIG. 2, the building server 18 includes a plurality of input ports 20 that can each be connected to a plurality of electric meters 16. In the preferred embodiment of the invention, each input port 20 can be connected to up to thirty-two electric meters 16, such that up to 128 separate electric meters 16 could be connected to a single building server 18. The building server 18 has its own address and also assigns a distinct address for each of the electric meters 16 connected to it, such that each of the electric meters 16 can communicate to the network 12 through the building server 18. Although the building server 18 is shown as being connected to a plurality of electric meters 16, other devices such as water meters, gas meters, power monitors, HVAC equipment, circuit breakers, generators, uninterruptable power supplies (UPS), programmable controller, and analog and digital I/O devices can also be connected to the building server 18. The building server 18 thus operates to provide a gateway to the computer network 12, such that components connected to the building server 18 can communicate through the computer network 12 without the need for internal hardware contained within each electric meter 16 to facilitate communication over the network 12. Specifically, since the computer network 12 is the Internet, the building server 18 formats the energy usage information from the electric meters 16 into the specific Internet protocol (IP) format that can be transmitted across the Internet.

In addition to the four input ports 20, the building server 18 also includes three types of Ethernet ports. The first Ethernet port 22 is a 10-base-T (twisted pair) Ethernet port. The second Ethernet port 24 is a 10-base-5 (thick wire) Ethernet port, while the third Ethernet port 26 is a 10-base-2 (thin wire) Ethernet port. The three types of Ethernet ports 22–26 contained on the building server 18 allow the building server 18 to be configured for use with many types of Ethernet connections.

In addition to the Ethernet ports, the building server 18 includes a set-up port 28 that allows the building server 18 to be initially configured. During the initial setup using the set-up port 28, an external personal computer is used to download address information to the building server 18 and configure the internal software loaded within the building server 18.

A reset button 30 is contained on the building server 18 that can be used to reset the building server 18 if problems occur during operation. A set of indicator lights 32 are contained on the building server 18 to indicate when the building server 18 is powered on as well as when the CPU and diagnostic functions contained within the building server 18 are active.

As previously discussed, each of the building servers 18 includes its own distinct address such that it can be contacted over the network 12. In the preferred embodiment, the computer network 12 is the Internet such that each building server 18 includes an Internet protocol (IP) address that allows the building server 18 to communicate through the Internet in a conventional manner. The IP address for the building server 18 enables information to be routed from one part of the Internet to the building server 18 in pieces called "packets" and then reassembled when the information reaches its destination. Typically, an IP address is a four-part number separated by periods (for example, 165.113.245.2) that uniquely identifies a machine on the Internet. Every machine on the Internet has an unique IP address, such that only one machine is contacted for each IP address.

In the preferred embodiment of the invention, a building server 18 is typically connected to all of the electric meters 16 contained within a single building and provides the network gateway for the electric meters 16. If an electric customer has multiple buildings each located at distinct remote locations, each of the individual buildings would typically include its own building server 18. Each building server 18 would then have its own IP address such that each building server 18 could be contacted separately over the computer network 12. Since the Internet is almost an unbounded network, an unlimited number of building servers 18 could be connected to the network 12.

Along with being connected to the standard electric meters 16, the building server 18 could also be connected to one or more serial pulse input modules (S-PIM) 33. The S-PIM 33 provides a device level interface for pulse output revenue meters, flow meters and digital inputs/outputs for centralized and aggregated energy data. Each of the S-PIMs 33 can be connected to up to six electronic devices produced by various manufacturers. For example, revenue meters for electricity, gas and water could each be individually connected to one of the S-PIMs 33. In the preferred embodiment of the invention, each S-PIM 33 can store up to 30 days of information taken at 15 or 30 minute intervals from each of the revenue meters.

In addition to the building server 18, other types of devices that record and monitor energy related information could also be connected to the computer network 12. For example, an Ethernet-enabled power quality meter 34 could be directly connected to the network 12. The power quality meter 34 typically includes hardware and software that allows the power quality meter 34 to communicate directly over a computer network. For example, the power quality meter 34 could be an Allen Bradley Power Monitor II. The power quality meter 34 would then have its own IP address such that it could be contacted through the computer network 12. Additionally, an uninterruptable power source (UPS) 36 that is network enabled could also be directly connected to the computer network 12. Like the power quality meter 34, the UPS 36 includes hardware and software that allow the UPS 36 to communicate directly through the computer network 12.

In addition, standard revenue meters 38 could also be connected to the computer network 12 through one of the S-PIMs 33 without using one of the building servers 18. The S-PIM 33 communicates through modems 39 to the computer network 12. Like the other types of components previously discussed, the stand-alone S-PIM 33 would include its own IP address so that it could be contacted through the computer network 12.

An Ethernet pulse input module (E-PIM) 40 can be connected directly to the network 12 as shown. The E-PIM 40 provides device level interface to connect pulse output revenue flow meters and digital inputs/outputs to an Ethernet, such as network 12. The E-PIM 40 can be used to read pulses from a variety of flow meters, including electricity, water and gas meters. The E-PIM 40 can be connected to up to six single input pulse meters or three two-input pulse meters and can store up to 30 days of information taken at 15 or 30 minute intervals from each of the pulse meters. The E-PIM 40 is assigned its own IP address and can communicate through the computer network 12 based on this IP address.

An Internet protocol (IP) revenue meter 41 can be directly connected to the network 12. The IP revenue meter 41 is a standard revenue meter with an Ethernet Internet protocol (IP) card inserted to allow the revenue meter to communicate over the network 12. In this manner, a standard revenue meter can be reconfigured to communicate directly over the network 12.

Finally, a remote generator 42 can be connected to the network 12 to both communicate across the network and be turned on and off through signals transmitted across the network 12. The generator 42 is typically located in a building or facility in which the energy consumption is being monitored by the energy information and control system 10 of the present invention. The operation of the energy information and control system 10 to regulate usage of the generator 42 will be discussed in greater detail below.

As shown in FIG. 1, the energy information and control system 10 includes a primary server 44 connected to the computer network 12. In one preferred embodiment of the invention, the primary server 44 is owned and operated by a service provider separate from the energy customer, while the building servers 18 and energy meters 16 are located in the buildings of the energy customer. Other configurations for the energy management system 10, including a customer owned and operated primary server 44, will be discussed with reference to the remaining figures.

The primary server 44 generally functions to request the transmission of energy usage information from the building servers 18, the S-PIMs 33, the power quality meter 34, the UPS 36, the E-PIM 40, the generator 42 and the IP revenue meter 41 across the computer network 12 and receives the energy usage information from each of the devices. As discussed, in the preferred embodiment of the invention, the computer network 12 is the Internet. The primary server 44 generally includes a translating and operating program 46, a database engine 48, a power database 50, an Internet server 52, and an http translating program 54. The primary server 44 functions to request the transmission of energy usage information from each of the devices connected to the computer network 12 and stores the received energy usage information in the power database 50. Additionally, devices such as the IP revenue meter 41 can be configured to "push" information across the network 12 at regular intervals without being triggered by the primary server 44, which is also stored in the power database 50.

The power database 50 interprets the energy usage information received from each of the devices connected to the computer network 12 and generates energy consumption statistics for desired combinations of the devices. For example, if a single energy customer has a building server 18 in a first building, a stand-alone S-PIM 33 in a second building, a power quality meter 34 in a third building and a UPS 36 in a fourth building, the power database 50 can combine the energy usage information received from each of the devices into a single energy consumption statistic. Alternatively, the power database 50 can combine any combination of the energy usage information received from the devices connected to the computer network 12 based on a user selection within the primary serve 44. Thus, the power database 50 can aggregate energy information based on user selected criteria.

During operation of the energy information and control system 10, the translating and operating program 46 sends a properly addressed information request through the computer network 12 to the particular energy monitoring device that needs to be interrogated, such as the building server 18. Since the building server 18 has its own distinct IP address, only the desired building server 18 responds to the message sent by the primary server 44. Upon receiving a request for energy usage information, the building server 18 then transmits energy usage information from the electric meters 16 and S-PIMs 33 connected thereto back across the computer network 12. The building server 18 sends the energy usage information in a packet in the proper Internet form having the IP address of the primary server 44.

In the preferred embodiment of the invention, the primary server 44 sends a request for information to each of the building servers 18 at a predefined interval. For example, in the preferred embodiment of the invention, the primary server 44 requests energy usage information from each building server 18 every 1 to 60 minutes. Since energy usage information is transferred across the network 12 from the building server 18 to the primary server 44 almost instantaneously, the power database 50 contains real-time information concerning the power consumption at the location containing the building server 18. This information can then be aggregated based on user selected criteria, either in real-time or as a historical trend.

Upon receiving the packet of energy usage information from the building server 18, the translating and operating program 46 in the primary server 44 translates the information into a form that can be read and interpreted by the database engine 48. The database engine 48 takes the translated information and stores the energy usage information in the power database 50.

In the embodiment shown in FIG. 1, one or several monitoring stations 56 can be coupled to the computer network 12. The monitoring stations 56 can be located in a different location from both the primary server 44 and the building server 18 and can communicate with the primary server 44 over the computer network. 12. As was discussed, in the preferred embodiment of the invention the computer network 12 is the Internet, such that each of the monitoring stations 56 can be equipped a commercially available web browser that allows the monitoring station 56 to communicate over the computer network 12. The monitoring stations 56 can be commercially available personal computers that are connected to an access line 58 that provides access to the computer network 12. The monitoring stations 56 can access the primary server 44 in a conventionally known manner by keying in the IP address of the primary server 44.

Once the monitoring stations 56 access the primary server 44, the primary server 44 can communicate with the monitoring stations 56 through the web server 52 contained in the primary server 44. The web server 52 communicates through the http translating program 54 to provide access to the power database 50. In the preferred embodiment of the invention, the web server 52 presents the data contained in the power database 50 in either graphical or tabular form to be interpreted by the user of the monitoring station 56. Since the monitoring station 56 can be located anywhere there is access to the computer network 12, the energy information and control system 10 of the present invention allows the user in charge of facility management to be located in a building separate from the plurality of building severs 18. Additionally, since each of the building servers 18 communicates with the primary server 44 at preselected intervals, the person in charge of facility management can access the energy usage information from numerous building servers 18 in a real-time manner and can react accordingly. The energy information and control system 10 shown in FIG. 1 is scalable such that it can be tailored for smaller energy customers who do not wish to expend the monies required to maintain their own primary server 44. The energy information and control system 10 can be used by any size energy customer that has either multiple locations or wishes to access energy related information from a remote site. It can be further used by utilities that supply energy to precisely understand consumers energy usage and allow purchasing of aggregated amounts of electricity.

In the preferred embodiment of the invention, the Internet server 52 presents the data contained in the power database 50 in a graphical manner, taking advantage of the capabilities of the Internet network 12. Since each of the monitoring stations 56 includes an Internet browser, the information presented by the primary server 44 can be quickly and accurately displayed. In another advantage of the energy information and control system 10, the database engine 48 can aggregate the energy usage information from multiple locations to generate energy consumption statistics previously unobtainable. In this manner, the energy customer can be billed based upon the combination of multiple facilities to realize the billing advantages previously discussed.

In addition to aggregating multiple buildings or facilities into a single energy consumption value, the database engine 48 is capable of generating real-time energy consumption bills, since energy consumption information is received real-time at the primary server 44. Additionally, since energy consumption information is received in real-time, the database engine 48 can generate alarms when the energy consumption data is reaching an upper threshold value. An alarm generated in real-time allows energy management personnel to address possible overload conditions to anticipate and reduce a peak usage value before the peak occurs.

As was discussed previously, the generator 42 can be connected to the network 12 to either relay energy related information across the network or to be operated across the network 12. In many facilities, the remote energy producing generator 42 is often located on-site for either emergencies or generating supplemental energy during peak demand periods. Since the primary server 44 receives energy usage information across the network 12 in a real-time basis, the database engine 48 can perform numerous calculations on the data to determine the current energy costs being paid by the facility.

If the database engine 48 calculates that the cost of each additional energy unit would be greater than the cost of producing the same energy unit by the generator 42, the primary server 44 would generate a signal indicating that the generator 42 should be started to provide supplemental energy. Alternatively, the generator 42 could be configured to be automatically turned on by a signal generated by the primary server 44 and sent across the network 12. When activated, the generator 42 produces a supplemental energy output, thereby reducing the energy consumption received from a utility provider. In addition to being operated to reduce individual facility costs, it is contemplated that a commercial energy utility could be given access to customer-owned generators 44 and activate numerous generators 44 located in various locations during periods of peak energy demand. Thus, a series of generators 42 could supply supplemental energy during peak demand periods.

Figure 3:
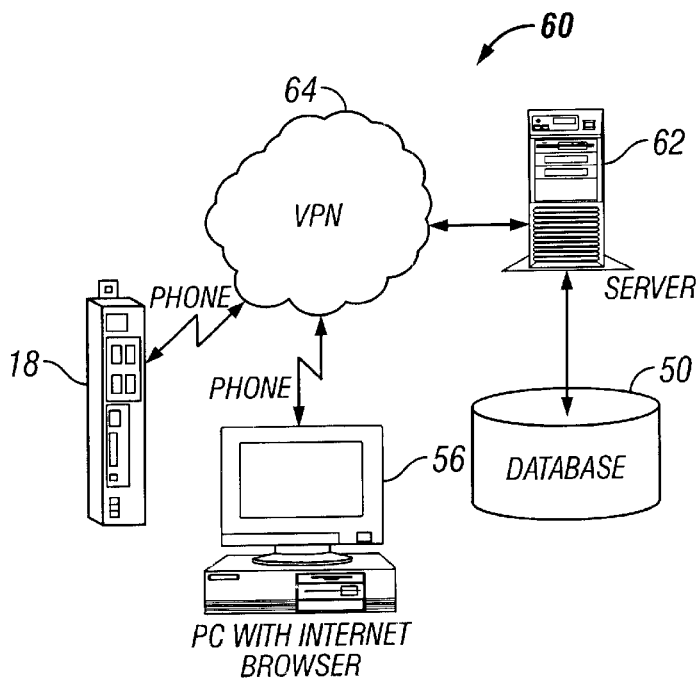
FIG. 3 is a schematic diagram of a second embodiment of the energy management system of the present invention.

Referring now to FIG. 3, thereshown is a second embodiment of the energy management system as indicated by reference numeral 60. In the second embodiment of the energy management system 60, a primary server 62 is connected to a virtual private network 64. A virtual private network 64 typically exist between multiple locations within the same company or organization. In many cases, the virtual private network 64 is actually a portion of the Internet that is restricted only to specified uses. The virtual private network 64 provides all the advantages of linked computers without the disadvantage of outside entities being allowed access to the network. In the same manner as discussed in the description of the first embodiment of the energy management system 10 shown in FIG. 1, the energy management system 60 of the second embodiment includes one or more building servers 18 coupled to the virtual private network 64. Additionally, multiple monitoring stations 56, each having an Internet browser, are connected to the virtual private network 64. Likewise, the primary server 62 includes the identical software as discussed in FIG. 1, such that the primary server 62 can communicate with the building servers 18 to receive energy usage information and process the energy usage information into energy consumption statistics that can be accessed by the monitoring stations 56. The second embodiment of the energy management system 60 shown in FIG. 3 is a small-scale system in which the energy customer maintains their own private primary server 62, unlike the primary server 44 maintained by an independent service provider.

Figure 4:
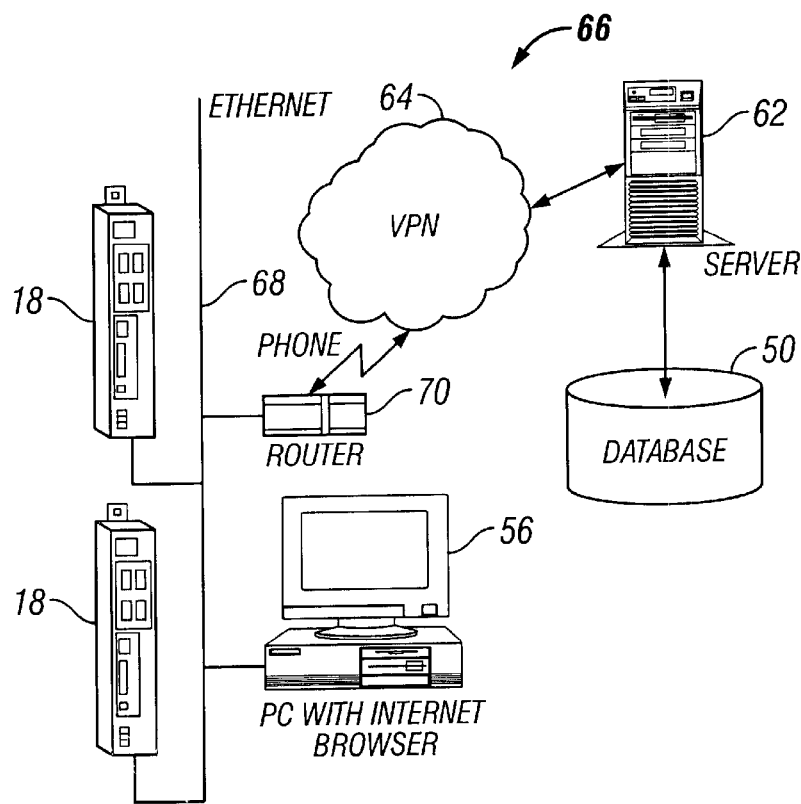
FIG. 4 is a schematic diagram of the energy management system of a third embodiment of the present invention.

Referring now to FIG. 4, thereshown in a third embodiment of an energy management system 66. The third embodiment of the energy management system 66 is a medium scale system for an energy customer slightly larger than the typical user for the small scale energy management system 60 shown in FIG. 3. In the energy management system 66 shown in FIG. 4, the system is again centered around a virtual private network 64. In the energy management system 66, the energy customer has an internal Ethernet 68 that links a series of devices. As shown in FIG. 4, a pair of building servers 18 are connected to the Ethernet 68, although a large number of building servers 18 can be used. The primary server 62 can communicate to the building servers 18 through the Ethernet 68. A router 70 connects the network 64 to the Ethernet 68. A monitoring station 56 including an Internet browser can communicate with the primary server 62 through the router 70 and the network 64 in a manner as previously discussed.

Figure 5:
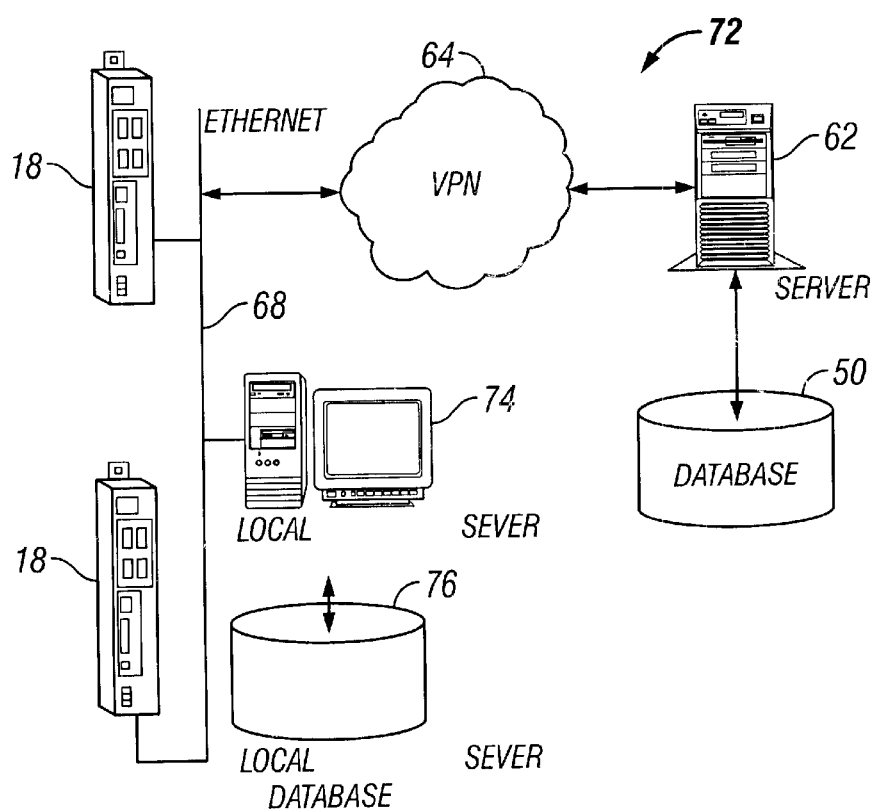
FIG. 5 is a schematic diagram of the energy management system of fourth embodiment of the present invention.

Referring now to FIG. 5, a fourth embodiment of the energy management system is shown as indicated by reference numeral 72. The energy management system shown in FIG. 5 is typically utilized by a large energy customer. In the energy management system 72, the primary server 62 is connected to the virtual private network 64, which in turn is directly connected to the Ethernet system 68. A pair of building server 18 are also shown connected to the Ethernet 68, such that the primary server 62 can receive energy usage information from the building servers 18 across the virtual private network 64. In the energy management system 72, a local server 74 including its own database 76 is connected to the Ethernet 68 to receive information directly from the building servers 18 as well as the primary server 62. The local server 74 is directly connected to the building servers 18 across the Ethernet 68, such that information does not have to pass across the virtual private network 64.

Various alternatives and embodiments are contemplated as being within the scope of the following claims particularly pointing out and distinctly claiming the subject matter regarded as the invention.

We claim:

1. An energy information and control system for monitoring and analyzing the power consumption at a plurality of locations, the system comprising:

a non-deterministic publicly accessible computer network for allowing the passage of electronic information across the network;

a plurality of energy meters coupled to the network and each having a unique network address, the energy meters transmitting energy usage information across the network;

a primary server coupled to the computer network for receiving the energy usage information transmitted across the network from the energy meters, the primary server combining the energy usage information from the plurality of energy meters into energy consumption statistics for the plurality of locations, wherein the primary server has a unique network address and communicates with each energy meter across the network utilizing the network address of the energy meter;

at least one monitoring station coupled to the computer network to access the energy consumption statistics from the primary server utilizing the primary server network address; and a generator connected to the network, the generator having a unique network address for receiving commands from the primary server and transmitting energy usage information across the network, wherein the primary server generates an indicator signal to activate the generator when the energy consumption statistics exceed an upper limit.

2. An energy information and control system for monitoring and analyzing the power consumption at a plurality of locations, the system comprising:

a non-deterministic computer network for allowing the passage of electronic information across the network;

at least one energy meter coupled to the network, the energy meter transmitting energy usage information across the network;

a primary server coupled to the network for receiving the energy usage information transmitted across the network, the primary server compiling the energy usage information into energy consumption statistics; and an energy generator coupled to the network and having a unique network address for receiving commands from the primary server and transmitting energy usage information across the network, wherein the primary server generates an indicator signal when the energy consumption statistics reach an upper limit to activate the energy generator to generate supplemental energy.

3. The energy information and control system of claim 2 wherein the energy generator is configured such that the energy generator can be activated by the primary server when the energy consumption statistics reach the upper limit.

4. The energy information and control system of claim 2 further comprising at least one building server connected to the network, the building server being coupled to at least one energy meter for converting a signal from the energy meter into energy usage information that can be transmitted across the computer network.

5. The energy information and control system of claim 2 wherein the energy meter and the generator have a distinct address such that the primary server can communicate with the energy meter and generator across the network by the distinct address.

6. The energy information and control system of claim 2 further comprising at least one monitoring station coupled to the network such that the monitoring station can access the energy consumption statistics from the primary server.

* * * * *